United States Patent
Hodges et al.

(10) Patent No.: US 6,503,305 B1
(45) Date of Patent: Jan. 7, 2003

(54) NON-TOXIC CORROSION INHIBITOR

(75) Inventors: Steve Hodges, Crown Point, IN (US); Wendy Novelli, Chicago Heights, IL (US)

(73) Assignee: Hammond Group, Inc., Hammond, IN (US)

( * ) Notice: Subject to any disclaimer, the term of this patent is extended or adjusted under 35 U.S.C. 154(b) by 0 days.

(21) Appl. No.: 09/575,842

(22) Filed: May 18, 2000

(51) Int. Cl.$^7$ .......................... C09D 1/00; C09D 5/08; C09C 1/00; C09C 1/02
(52) U.S. Cl. .............................. 106/14.12; 106/14.05; 106/14.11; 106/14.21; 106/461; 106/462; 106/463; 252/387
(58) Field of Search ............................ 106/14.05, 461, 106/462, 463, 14.11, 14.12, 14.21; 252/387

(56) References Cited

U.S. PATENT DOCUMENTS

| | | |
|---|---|---|
| 3,933,670 A | 1/1976 | Brill et al. |
| 4,016,087 A | 4/1977 | Narushima et al. |
| 4,144,074 A | 3/1979 | Itoh et al. |
| 4,201,592 A | 5/1980 | Doi et al. |
| 4,386,059 A | 5/1983 | Reichert et al. |
| 4,436,855 A | 3/1984 | Higgins et al. |
| 4,480,009 A | 10/1984 | Berger |
| 4,560,489 A | 12/1985 | Muir et al. |
| 4,576,695 A | 3/1986 | Owens |
| 4,615,918 A | 10/1986 | Reichert et al. |
| 4,683,019 A | 7/1987 | Motoki |
| 4,725,320 A | 2/1988 | Tury et al. |
| 4,802,921 A | 2/1989 | Motoki |
| 4,828,795 A | 5/1989 | Cook et al. |
| 4,844,756 A | 7/1989 | Forsberg |
| 4,908,143 A | 3/1990 | Dumdum et al. |
| 4,956,016 A | * 9/1990 | Opitz et al. .............. 106/14.12 |
| 4,990,184 A | 2/1991 | Dotson et al. |
| 4,994,121 A | 2/1991 | Sobata et al. |
| 4,999,250 A | 3/1991 | Richardson et al. |
| 5,000,862 A | 3/1991 | Waynick |
| 5,035,983 A | 7/1991 | Kiyonari et al. |
| 5,037,478 A | 8/1991 | Oaki et al. |
| 5,064,468 A | 11/1991 | Okai et al. |
| 5,077,332 A | * 12/1991 | Blattler et al. .............. 524/389 |
| 5,096,605 A | 3/1992 | Waynick |
| 5,102,565 A | 4/1992 | Waynick |
| 5,139,701 A | 8/1992 | McDonald |
| 5,156,775 A | 10/1992 | Blount |
| 5,166,456 A | 11/1992 | Yoshino |
| 5,176,894 A | 1/1993 | Sinko |
| 5,196,146 A | 3/1993 | Farella et al. |
| 5,292,834 A | 3/1994 | Watanabe et al. |
| 5,314,633 A | 5/1994 | Ryer et al. |
| 5,320,768 A | 6/1994 | Gutierrez et al. |
| 5,378,291 A | 1/1995 | Ara et al. |
| 5,378,446 A | 1/1995 | Sinko |
| 5,432,007 A | 7/1995 | Naito |
| 5,438,083 A | 8/1995 | Takimoto et al. |
| 5,458,678 A | 10/1995 | Armstrong et al. |
| 5,480,576 A | 1/1996 | Gary et al. |
| 5,487,779 A | 1/1996 | Sinko |
| 5,489,466 A | 2/1996 | Inaba et al. |
| 5,500,463 A | 3/1996 | Nishimura et al. |
| 5,529,811 A | 6/1996 | Sinko |
| 5,534,170 A | 7/1996 | Watts |
| 5,558,706 A | 9/1996 | Sinko |
| 5,607,820 A | 3/1997 | Nakamura |
| 5,612,093 A | 3/1997 | Braig et al. |
| 5,639,422 A | 6/1997 | Chen et al. |
| 5,656,070 A | 8/1997 | Clough |
| 5,665,149 A | 9/1997 | Gotzmann et al. |
| 5,703,103 A | 12/1997 | Heuer et al. |
| 5,704,961 A | 1/1998 | Hudson |
| 5,733,386 A | 3/1998 | Yoshida |

(List continued on next page.)

FOREIGN PATENT DOCUMENTS

| | | | |
|---|---|---|---|
| EP | 0 289 155 B1 | | 5/1993 |
| EP | 1096040 | * | 5/2001 |
| FR | 2672058 | * | 7/1992 |
| WO | 96/26983 | * | 9/1996 |

OTHER PUBLICATIONS

Derwent Abstract No. 1997–078312, abstract of German Patent Specification No. 195253341 (Jan. 1997).*
Derwent Abstract No. 1998–284766, abstract of Russian Patent Specification No. 2094529 (Oct. 1997).*
Protective Coatings Fundamentals of Chemistry and Composition, Clive H. Hare, Technology Publishing Company, 1994, pp 340–342 (no month).
ASTM Standards, Designation: B117—90, May 1990, pp. 20–26.
ASTM Standards, Designation: D610—95, Nov. 1995, pp. 13–15.
ASTM Standards, Designation: D 714—87, Jul. 1987, pp. 62–67.

*Primary Examiner*—Anthony J. Green
(74) *Attorney, Agent, or Firm*—Patula & Associates, P.C.

(57) ABSTRACT

A non-toxic chemical composition inhibits corrosion in metal substrates. The composition contains a Phosphorus compound, comprising an acid and a metal selected from the group consisting of an alkali, alkaline earth, or transition metal. The composition also contains a Boron compound comprising an acid and a metal selected from the group consisting of an alkali, alkaline earth, or transition metal. A process of making the chemical composition comprises the steps of filling a mixer with 30–60% by weight of hot water and adding 10–20% by weight of barium carbonate or strontium carbonate, 10–20% by weight of phosphoric acid (75%), 5–15% by weight of lime, and 10–20% by weight of Boric acid; mixing the said contents for 10–15 minutes to create a wet slurry; pouring said wet slurry into an attrition mill for 15–60 minutes; drying said wet slurry and milling said wet slurry to an average particle size of 1.0–2.0 microns to form a dry pigment; pushing said dry pigment through a 325 mesh sieve.

32 Claims, No Drawings

U.S. PATENT DOCUMENTS

| | | |
|---|---|---|
| 5,733,666 A | 3/1998 | Sinko |
| 5,759,705 A | 6/1998 | Sinko |
| 5,851,418 A | 12/1998 | Moore |
| 5,853,890 A | 12/1998 | Odawa et al. |
| 5,856,060 A | 1/1999 | Kawamura et al. |
| 5,858,299 A | 1/1999 | Fernholz et al. |
| 5,866,652 A | 2/1999 | Hager et al. |
| 5,868,820 A | 2/1999 | Claffey |
| 5,879,436 A | 3/1999 | Kramer et al. |
| 5,888,954 A | 3/1999 | Haerer et al. |
| 5,922,241 A | 7/1999 | Becker et al. |

* cited by examiner

NON-TOXIC CORROSION INHIBITOR

FIELD OF THE INVENTION

This invention relates to a composition that inhibits corrosion in metal surfaces, particularly as an additive to paint. The metal surface may be pre-treated with either a chromate or phosphate wash. The invention inhibits corrosion over or on the applied area by forming an oxide layer that is resistant to activities that create thermodynamic instability in metal surfaces, leading to corrosion. The invention is also designed to inhibit corrosion at a level of performance similar to chromate inhibitors; however, the present invention does not incorporate chromium, which is toxic, or any other toxic elements in its composition and is, therefore, non-toxic.

BACKGROUND OF THE INVENTION

The exposure of metals to water, oxygen, and other elements can lead to deterioration in the strength of the metal. The rusting of steel is an example of such corrosion to metal. Corrosion is an electrochemical process that takes place at the surface of a metal substrate in a gaseous or liquid environment. Interaction with outside elements causes the metal surface to be thermodynamically unstable, thereby becoming an electron and ion conductor and acceptor. One way in which inhibitors function is by reducing the amount of interaction at the surface of the metal by providing ions to react with outside elements and form an oxide layer which serves as a barrier against subsequent outside element reactions.

Inhibitors that deter corrosion in metals have been developed for a number of years. The most effective of these involve the use of chromate based compounds. Chromate compounds function in two ways to prevent the corrosion of a metal surface. Their first function is as an oxidizer which reduces chromium (VI) to chromium (III). Chromium (III) has 3 extra electrons in comparison to chromium (VI) and reacts with the metal ions at the surface of the metal substrate to form a thin barrier film to inhibit the corrosion process. Chromium is very soluble in water and readily liberates its ions as water penetrates the paint film. The chromium ions are carried to the metal/coating interface where they form a thin continuous film on the metal which results in polarization to a passive potential. The rate at which this reaction occurs has a substantial influence on the effectiveness and longevity of inhibition.

The toxicity of chromate based pigments leads to a search for alternatives. At the same time, however, pigments are desired that will deter corrosion with a level of performance similar to that of chromate based pigments. Currently, strontium chromate is the leading inhibitor used to prevent corrosion in such applications as metal deco, coil coatings, and thin film applications. There have been several non-toxic inhibitors, including phosphates, phosphosilicates, ion exchange and organic types that have been tested for anti-corrosion effectiveness. However, these non-toxic inhibitors do not perform as well as chromate compounds. One area in particular where the non-toxic compounds are inadequate is preventing creepage, or corrosive activity, at the cut edge of a metal to which they have been applied. These compounds are not able to duplicate the solubility level of chromium compounds and thus, cannot inhibit corrosion at the same level.

U.S. Pat. No. 5,866,652, to Hager, discloses a chromate-free protective coating. The composition of the inhibitor in the Hager invention requires the ester of a rare earth metal such as cerium and lanthanum oxalates and acetates as well as vanadate salts of alkali and alkali earth metals. Vanadium can cause instability in paint formulas, does not provide efficient solubility, and is toxic. The composition of the present invention does not require any form of vanadium. Thus, the present invention provides excellent stability in paint formulas and only slight drifts in viscosity after 30 days at room temperatures or higher.

Similarly, U.S. Pat. No. 5,064,468, to Okai, describes a corrosion preventive coating composition comprising a specific phosphorus compound, but also comprising a specific vanadium compound. Again, the presence of vanadium in the Okai compound creates a substantial difference from the present invention in that it does not satisfy the main objectives of the present invention, which are inhibition of corrosion, at an effective level of solubility, without toxicity.

Previous versions of chromate-free inhibitors have required carboxylic acids in their formation, i.e., U.S. Pat. No. 4,999,250, to Richardson, and U.S. Pat. No. 5,458,678, to Armstrong. However, carboxylic acids are not used in the creation of the present invention, and are not present in the final composition of the present invention. Furthermore, while carboxylic acids do promote adhesion of a primer to the cut edge, they do not aid the inhibition of corrosion. Coating systems containing the present invention may be applied at a dry film thickness, ("DFT"), of 4–8 microns, providing excellent adhesion without the need for carboxylic acids in the composition.

The present invention addresses the need for an effective soluble inhibitor while satisfying the desire for non-toxicity. The composition of the inhibitor of the present invention is based on the following major chemical reactions:

$$M^+CO_3 + H_3PO_4 \rightarrow M^+HPO_4 + H_2O + CO_2 \text{ (gas)}$$

$$CaO + H_3BO_3 \rightarrow CaHBO_3 + 2H_2O$$

The borate ions provide anodic protection by forming a continuous borate film at the coating/substrate interface, thus providing improved adhesion. In addition, phosphate ions provide solubility at low pH levels. The combination of theses ions provides great synergistic value, in that the present invention inhibits corrosion at the same level as chromium compounds due to its higher percentage solubility.

The preferred embodiments of the composition of the inhibitor are Barium borophosphate and Strontium borophosphate. The present invention allows the metal ions in the inhibitor, preferably barium or strontium ions, to react with outside elements such as nitrites, to form salts. The resulting barrier reduces the amount of corrosion occurring at the surface of the metal. Furthermore, the present invention displays high solubility in a pH range of 2–8, thus allowing for greater liberation of ions than seen by chromium compounds. In addition, by eliminating the need for Chromium in the final composition or in the process of creating the invention, the invention also eliminates toxicity.

SUMMARY OF THE INVENTION

The object of the present invention is to inhibit corrosion in a metal surface on or over the applied area at the same performance level of a chromate inhibitor, in particular Strontium chromate. The present invention displays corrosion reduction, when subject to salt spray, similar to strontium chromate. The borophosphate inhibitors of the present invention have displayed similar edge and scribe creepage, in comparison to strontium chromate, on chromate pretreated hot dipped galvanized steel panels as well as similar overall visual ratings for that system. In a polyester primer system, the inhibitors had less creepage at the cut edge and blistering in the field area for chromate pre-treated hot dipped galvanized steel panels. After applying the same coating to phosphate pre-treated hot dipped galvanized steel, the barium borophosphate composition displayed less creepage at the cut edge and performed better overall in comparison to strontium chromate. Furthermore, the borophosphate inhibitors have displayed excellent solubility in the pH range of 2–8, in comparison to strontium chromate, thus exhibiting a stronger ability to inhibit corrosion.

Another object of the invention is to provide a non-toxic means of inhibiting corrosion of metal. By combining a phosphorus compound, comprised of an acid and a metal selected from the group consisting of an alkali, alkaline earth, or transition metal, and a boron compound, comprised of an acid and a metal selected from the group consisting of an alkali, alkaline earth, or transition metal, the resulting composition provides corrosion inhibition comparable to strontium chromate without comparable toxicity.

Numerous other advantages and features of the invention will become readily apparent from the detailed description of the preferred embodiment of the invention and from the claims.

DETAILED DESCRIPTION IF THE INVENTION

While the invention is susceptible of embodiment in many different forms, there will be described herein in detail a preferred embodiment of the invention. It should be understood, however, that the present disclosure is to be considered an exemplification of the principles of the invention and is not intended to limit the spirit and scope of the invention and/or claims of the embodiment illustrated.

The present invention is a corrosion preventive pigment comprising a phosphorus compound, from an acid, and an alkali, alkaline earth, or transition metal; and also comprising a boron compound, from an acid, and an alkali, alkaline earth or transition metal.

The phosphorus compound is prepared by reacting a metal carbonate with phosphoric acid, preferably. The result is a metal phosphate, water and carbon dioxide gas. The boron compound is prepared by reaction of calcium oxide and boric acid, preferably, to yield calcium borate and water. The reactions are as follows:

$M^+CO_3+H_3PO_4 \rightarrow M^+HPO_4+H_2O+CO_2$ (gas)

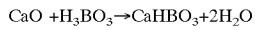
$CaO +H_3BO_3 \rightarrow CaHBO_3+2H_2O$

These reactions are performed in hot water inside of a batch mixer. The wet slurry is dried and the particle size is reduced for incorporation into paint. The inhibitor is then used in a primer coat that is applied at a dry film thickness of 4–8 microns while the top coat may be applied at a dry film thickness of 28–55 microns. The inhibitor then provides optimum corrosion protection for environments with a pH range of 2–8.

Without intending to limit the scope of the present invention, the method of creating the composition may be better understood by referring to the following examples:

EXAMPLE 1

A mixer is filled with 30–60% by weight (for example 10–50 pounds) of hot water. To the water is added 10–20% by weight (for example 1–25 pounds) of barium carbonate. Then, 10–20% by weight (for example 1–25 pounds) of phosphoric acid (75%) is added. Next, 5–15% by weight (for example 1–25 pounds) of lime is added. Finally, 10–20% by weight (for example 1–25 pounds) of Boric acid is added. Next, the batch is allowed to mix for 10–15 minutes. The wet slurry is poured into an attrition mill for 15–60 minutes. Then, the slurry is dried and milled to an average particle size of 1.0–2.0 micron and analyzed for physical properties. The dry pigment is then pushed through a 325 mesh sieve, or approximately 45 microns, to reduce particle size before incorporation into paint. The inhibitor created by this reaction is barium borophosphate.

The preferred embodiment of barium borophosphate consists of 53.0% by weight (for example 25.0 pounds) hot water, 17.6% by weight (for example 8.3 pounds) barium carbonate, 11.4% by weight (for example 5.4 pounds) phosphoric acid, 7.0% by weight (for example 3.3 pounds) lime, and 11% by weight (for example 5.2 pounds) boric acid, mixed in a batch for 10–15 minutes. The wet slurry is poured into an attrition mill for 15–60 minutes. Then, the slurry is dried and milled to a particle size in the range of 1.0–2.0 microns and analyzed for physical properties. The dry pigment is then pushed through a 325 mesh sieve to reduce particle size before incorporation into paint.

EXAMPLE 2

The procedure of Example 1 is followed with the substitution of strontium carbonate for barium carbonate. The amount of hot water used is 30–60% by weight (for example 10–50 pounds). The amount of strontium carbonate used is 10–20% by weight (for example 1–25 pounds). The amount of Phosphoric acid used is 10–20% by weight (for example 1–25 pounds). The amount of Lime used is 5–15% by weight (for example 1–25 pounds). The amount of Boric acid used is 10–20% by weight (for example 1–25 pounds). The inhibitor created by this reaction is strontium borophosphate.

The preferred embodiment of strontium borophosphate consists of 56.3% by weight (for example 25.0 pounds) hot water, 11.9% by weight (for example 5.3 pounds) strontium carbonate, 12.2% by weight (for example 5.4 pounds) phosphoric acid (75%), 7.4% by weight (for example 3.3 pounds) lime, and 12.2% by weight (for example 5.4 pounds) boric acid, mixed in a batch for 10–15 minutes. The wet slurry is poured into an attrition mill for 15–60 minutes. Then, the slurry is dried and milled to a particle size in the range of 1.0–2.0 microns and analyzed for physical properties. The dry pigment is then pushed through a 325 mesh sieve to reduce particle size before incorporation into paint.

The inhibitors created in Examples 1 and 2 were mixed into individual paints using the epoxy and polyester starting point primer formulas from Shell Chemical Company (No. 301) and Creanova (No. ML525). The inhibitors were then blended into the epoxy and polyester primers and sand milled to achieve a 6.5+Hegman grind. A High Gloss polyester topcoat was used over the primers.

The epoxy primer was applied to chromate pre-treated and phosphate pre-treated galvanized steel panels using a #16 rod. Then, the panels were immediately placed in a 200° C. oven for 20 minutes providing a DFT of 7–10 microns. After being removed from the oven, the panels were placed in cold tap water in order to stop the crosslinking of the film. The topcoat was applied with a #28 rod in order to obtain a DFT of 22–26 microns. Then, the panels were cut in half in order to expose the edge for evaluation. The panels were scribed using a scribe machine, then subjected to Salt Spray testing with the cut edge on top.

The polyester primer was applied in the same manner with the exception that the panels were placed in a 250° C. oven for 10 minutes. These panels were also scribed using a scribe machine, then subjected to Salt Spray testing with the cut edge on top.

The panels with borophosphate inhibitors were measured against those panels containing no inhibitor, ("Blank"), as well as those containing Strontium chromate inhibitor. The Salt Spray Testing method used was ASTM accelerated test method B-117, for a period of 504 hours. The ASTM Methods for rating the degree of corrosion on the panels are as follows:

| EXAMINED AREA | RATING METHOD |
| --- | --- |
| PANEL CORROSION | D 610-85 |
| SCRIBE CORROSION | D 1654-79A |
| PANEL/SCRIBE BLISTER | D 714-87 |

The results of the Salt Spray Testing for the epoxy primer on Chromate Pre-treated HDG (G60/1303) Substrate are in Table 1:

TABLE 1

| Inhibitor | DFT | Panel Blist | Panel Corr | Scribe | EDGE | Overall |
| --- | --- | --- | --- | --- | --- | --- |
| Blank/No Inhibitor | 7.07/ 28.92 | 8F | 8 | 8-5/50% 2M, 6M | 7 mm 50% | 4 |
| Strontium Chromate | 7.37/ 28.45 | 10 | 10 | 9-7/15% 6-8M | 5 mm 15% | 8- |
| Barium Borophosphate | 7.11/ 28.72 | 10 | 10 | 9-3/10% 2M, 6MD | 5 mm 10% | 7 |
| Strontium Borophosphate | 7.62/ 29.14 | 10 | 10 | 8-7/75% 6D | 4 mm 5% | 8 |

The borophosphate inhibitors displayed similar results to Strontium chromate for panel blistering and panel corrosion. Furthermore, the borophosphate inhibitors displayed similar overall visual ratings for rusting and blistering. In addition, strontium borophosphate displayed less creepage at the cut edge than strontium chromate.

The results of the Salt Spray Testing for the epoxy primer on a Phosphate Pretreated HDG (G90/1421) Substrate are in Table 2:

TABLE 2

| Inhibitor | DFT | Panel Blist | Panel Corr | Scribe | EDGE | Overall |
| --- | --- | --- | --- | --- | --- | --- |
| Blank/No Inhibitor | 7.07/ 28.92 | 8F | 9 | 10-5/50% 4F, 8MD | 5 mm 75% | 5 |
| Strontium Chromate | 7.37/ 28.45 | 10 | 10 | 10-8/2% 6VF | 2 mm 5% | 9 |
| Barium Borophosphate | 9.65/ 29.09 | 8F | 9 | 10-7/50% 6MD | 3 mm 10% | 7 |
| Strontium Borophosphate | 11.18/ 29.17 | 8F | 9 | 10-7/5% 6MD | 4 mm 20% | 7 |

The borophosphate inhibitors displayed panel corrosion results comparable to strontium chromate in the field area.

The results of the Salt Spray testing for polyester primer on a Chromate Pretreated HDG (G60/1303) Substrate are in Table 3:

TABLE 3

| Inhibitor | DFT | Panel Blist | Panel Corr | Scribe | EDGE | Overall |
| --- | --- | --- | --- | --- | --- | --- |
| Blank/No Inhibitor | 14.48/ 52.58 | 8F | 9 | 8-6/50% 6M, 8D* | 8 mm 10% | 5 |
| Strontium Chromate | 14.73/ 39.88 | 4VF | 8 | 8-6/80% 6MD | 8 mm 10% | 7 |
| Barium Borophosphate | 16.00/ 49.28 | 8F | 9 | 8-6/50% 4M | 4 mm 5% | 8 |
| Strontium Borophosphate | 14.23/ 37.60 | 8F | 9 | 8-5/50% 2F, 4M | 3 mm 10% | 8 |

Note to Table 3
(a) The blank specimen displayed a halo effect around the scribe indicating severe corrosion under the film.

Although strontium chromate showed less creepage at the scribe, the borophosphate inhibitors showed less creepage at the cut edge as well as smaller diameter blistering than strontium chromate. The borophosphate inhibitors also showed better overall visual ratings.

The results of the Salt Spray testing for polyester primer on a Phosphate Pretreated HDG (G60/1421) Substrate are in Table 4:

TABLE 4

| Inhibitor | DFT | Panel Blist | Panel Corr | Scribe | EDGE | Overall |
| --- | --- | --- | --- | --- | --- | --- |
| Blank/No Inhibitor | 18.54/ 47.25 | 10 | 10 | 9-6/15% 4F, 6MD | 4 mm 10% | 7 |
| Strontium Chromate | 16.51/ 45.98 | 10 | 10 | 9-7/25% 6M | 5 mm 10% | 8 |
| Barium Borophosphate | 21.08/ 38.10 | 10 | 10 | 9-7/2% 6VF, 8F | 4 mm 10% | 9 |
| Strontium Borophosphate | 12.70/ 38.61 | 10 | 10 | 9-6/5% 4M | 5 mm 25% | 5+ |

The borophosphate inhibitors showed results similar to strontium chromate for both panel blistering and panel corrosion. Barium borophosphate had less creepage at the cut edge than strontium chromate and had a better overall visual rating.

The stability of strontium borophosphate and barium borophosphate were also measured after 30 days at room temperature and 55 degrees Celsius. The viscosity results, in Krebs units, are shown in Tables 5 and 6:

TABLE 5

Epoxy System
(Stormer Viscosity/Krebs Units)

| INHIBITOR | INITIAL VISCOSITY | FINAL VISCOSITY @ ROOM TEMP | FINAL VISCOSITY @ 55° CELSIUS |
| --- | --- | --- | --- |
| BLANK/NO INHIBITOR | 66 | 68 | 67 |
| STRONTIUM CHROMATE | 68 | 67 | 65 |
| BARIUM BOROPHOSPHATE | 68 | 65 | 66 |
| STRONTIUM BOROPHOSPHATE | 68 | 67 | 67 |

TABLE 6

Polyester System
(Stormer Viscosity/Krebs Units)

| INHIBITOR | INITIAL VISCOSITY | FINAL VISCOSITY @ ROOM TEMP | FINAL VISCOSITY @ 55° CELSIUS |
|---|---|---|---|
| BLANK/NO INHIBITOR | 64 | 80 | 66 |
| STRONTIUM CHROMATE | 64 | 63 | 66 |
| BARIUM BORO-PHOSPHATE | 63 | 63 | 63 |
| STRONTIUM BORO-PHOSPHATE | 65 | 65 | 64 |

The inventive inhibitors showed only slight drifts in viscosity after 30 days as well as excellent package stability in both the epoxy and polyester paints.

Furthermore, the borophosphate inhibitors exhibited considerably greater solubility for the pH range 2–8 in comparison to the chromate inhibitor, which would correspond to better inhibition at the cut edge of metal substrates.

While the foregoing specification describes the preferred embodiment of the invention, other embodiments besides barium borophosphate and strontium borophosphate may be articulated as well. The terms and expressions therefore serve only to describe the invention by example only and not to limit the invention. It is expected that others will perceive differences which while differing from the foregoing, do not depart from the spirit and scope of the invention herein described and claimed.

Overall, the present invention provides comparable, if not superior, inhibition than strontium chromate, for panel blistering and panel corrosion as well as reduced corrosion at the cut and scribe edges of a metal substrate. Furthermore, the present invention is highly soluble, allowing for inhibition through a broad pH range. The present invention also has excellent stability, thus decreasing the rate of corrosion occurring at the surface of the metal substrate. Lastly, the inhibitor does not contain chromium or any other toxic elements, and is therefore, non-toxic.

What is claimed is:

1. A chemical composition that inhibits corrosion in metal substrates, said composition comprising:
   a Phosphorus compound, comprising phosphoric acid and a metal selected from the group consisting of strontium and barium; and
   a Boron compound comprising boric acid and a metal comprising calcium.

2. The composition in claim 1, wherein the metal of said phosphorus compound is Strontium, in the form of Strontium carbonate.

3. The composition in claim 1, wherein the metal of said phosphorus compound is Barium, in the form of Barium carbonate.

4. The composition in claim 1, wherein the metal of said boron compound is Calcium, in the form of Calcium oxide.

5. The composition in claim 1, wherein said phosphorus compound is Strontium phosphate.

6. The composition in claim 1, wherein said phosphorus compound is Barium phosphate.

7. The composition in claim 1, wherein said boron compound is Calcium borate.

8. A paint mixture, including the chemical composition in claim 1, that, when applied to a metal surface, inhibits corrosion of the metal.

9. A paint mixture, including the chemical composition in claim 1, that, when applied to a metal surface, inhibits corrosion of the metal in a pH range of 2–8.

10. A corrosion inhibitor for use in a protective surface coating for metal comprising:
    a Phosphorus compound; and
    a Boron compound;
    said Phosphorus compound comprises an acid and a metal selected from the group consisting of an alkali, alkaline earth metal, and transition metal; and
    said Boron compound comprises an acid and a metal selected from the group consisting of an alkali, alkaline earth metal, and transition metal;
    wherein said corrosion inhibitor remains dormant in said protective surface coating until activated by a breakdown in said protective surface coating.

11. The inhibitor in claim 10, wherein the acid of the Phosphorus compound comprises Phosphoric acid.

12. The inhibitor in claim 10, wherein the alkaline earth metal of the Phosphorus compound comprises Strontium.

13. The inhibitor in claim 10, wherein the alkaline earth metal of the Phosphorus compound comprises Barium.

14. The inhibitor in claim 10, wherein the acid of the Boron compound comprises Boric acid.

15. The inhibitor in claim 10, wherein the alkaline earth metal of the Boron compound comprises Calcium.

16. The inhibitor in claim 10, wherein the alkaline earth metal of the Phosphorus compound comprises Strontium, in the form of Strontium carbonate.

17. The inhibitor in claim 10, wherein the alkaline earth metal of the Phosphorus compound comprises Barium, in the form of Barium carbonate.

18. The inhibitor in claim 10, wherein the alkaline earth metal of the Boron compound comprises Calcium, in the form of Calcium oxide.

19. A process of making a non-toxic corrosion inhibitor comprising the steps of providing 30–60% by weight of water and adding 10–20% by weight of barium carbonate, 10–20% by weight of phosphoric acid (75%), 5–15% by weight of lime, and 10–20% by weight of Boric acid.

20. The process in claim 19, further comprising the step of mixing the said 30–60% by weight of water, 10–20% by weight of barium carbonate, 10–20% by weight of phosphoric acid (75%), 5–15% by weight of lime, and 10–20% by weight of Boric acid for 10–15 minutes to create a wet slurry.

21. The process in claim 20, further comprising the step of pouring said wet slurry into an attrition mill for 15–60 minutes.

22. The process of claim 21, further comprising the step of drying said wet slurry and milling said wet slurry to an average particle size of 1.0–2.0 microns to form a dry pigment.

23. The process of claim 22, further comprising the step of pushing said dry pigment through a 325 mesh sieve.

24. A non-toxic corrosion inhibitor made by the process of claim 19.

25. The inhibitor of claim 24, wherein said inhibitor is barium borophosphate.

26. A process of making a non-toxic corrosion inhibitor comprising the steps of providing 30–60% by weight of water and adding 10–20% by weight of strontium carbonate, 10–20% by weight of phosphoric acid (75%), 5–15% by weight of lime, and 10–20% by weight of Boric acid.

27. The process in claim 26, further comprising the step of mixing the said 30–60% by weight of water, 10–20% by weight of strontium carbonate, 10–20% by weight of phosphoric acid (75%) 5–15% by weight of lime, and 10–20% by weight of Boric acid for 10–15 minutes to create a wet slurry.

28. The process in claim 27, further comprising the step of pouring said wet slurry into an attrition mill for 15–60 minutes.

29. The process of claim further comprising the step of drying said wet slurry and milling said wet slurry to an average particle size of 1.0–2.0 microns to form a dry pigment.

30. The process of claim 29, further comprising the step of pushing said dry pigment through a 325 mesh sieve.

31. A non-toxic corrosion inhibitor made by the process of claim 26.

32. The inhibitor of claim 31, wherein said inhibitor is strontium borophosphate.

* * * * *